(12) United States Patent
Bradley

(10) Patent No.: US 7,016,398 B2
(45) Date of Patent: Mar. 21, 2006

(54) MULTICODE RECEIVER

(75) Inventor: Wayne H. Bradley, West Chicago, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 844 days.

(21) Appl. No.: 09/882,190

(22) Filed: Jun. 15, 2001

(65) Prior Publication Data

US 2003/0039301 A1 Feb. 27, 2003

(51) Int. Cl.
*H04B 1/69* (2006.01)
*H04B 1/707* (2006.01)

(52) U.S. Cl. .................................. 375/147; 375/150

(58) Field of Classification Search ................ 375/147, 375/140, 142, 143, 150, 316, 343, 130, 151, 375/152, 153
See application file for complete search history.

(56) References Cited

U.S. PATENT DOCUMENTS

| | | | | |
|---|---|---|---|---|
| 3,835,392 A | * | 9/1974 | Mahner et al. | 455/138 |
| 5,802,111 A | * | 9/1998 | Diehl et al. | 375/259 |
| 5,894,494 A | | 4/1999 | Davidovici | 375/208 |
| 5,953,370 A | | 9/1999 | Durrant et al. | 375/208 |
| 6,005,887 A | * | 12/1999 | Bottomley et al. | 375/147 |
| 6,252,899 B1 | * | 6/2001 | Zhou et al. | 375/140 |
| 2002/0051486 A1 | * | 5/2002 | Aue | 375/150 |

* cited by examiner

*Primary Examiner*—Chieh M. Fan
*Assistant Examiner*—Jason M. Perilla
(74) *Attorney, Agent, or Firm*—Foley & Lardner, LLP

(57) ABSTRACT

A code division multiple access (CDMA) receiver detects, de-scrambles, and de-spreads multiple channels that utilize different binary codes. The processing that is common to all channels can be performed once thus saving gate count and power consumption.

18 Claims, 2 Drawing Sheets

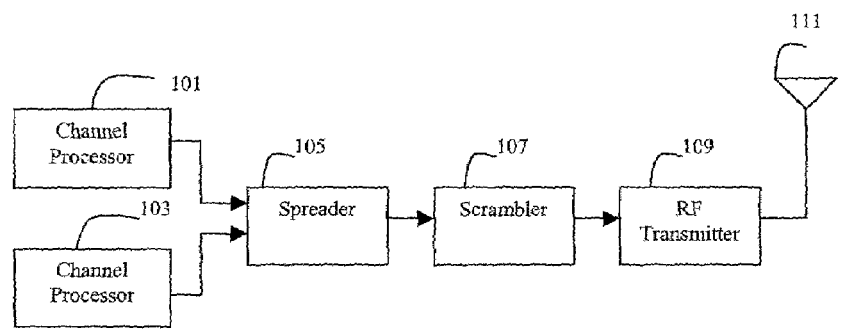
Fig. 1 100
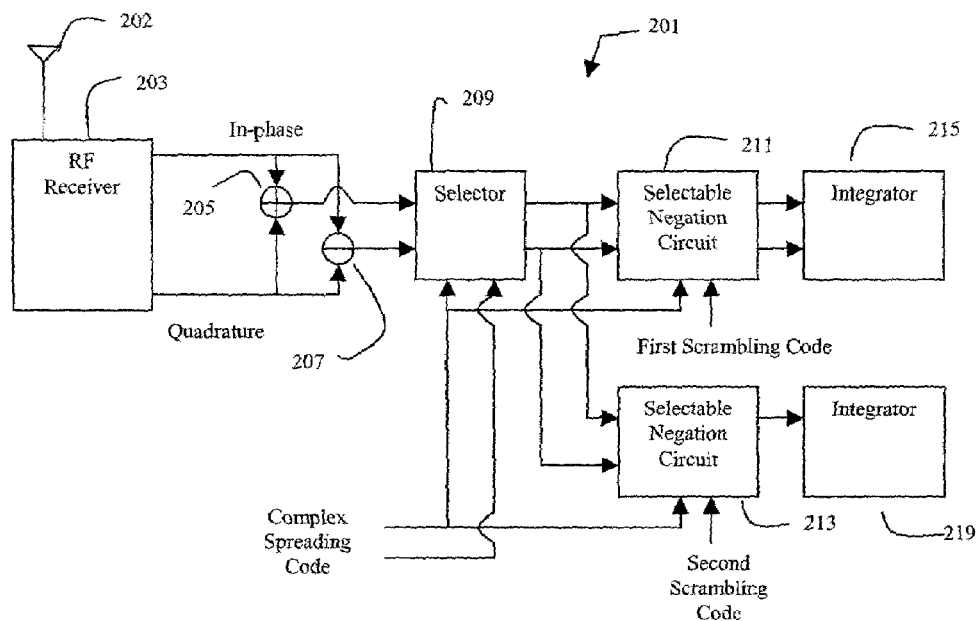
Fig. 2 200

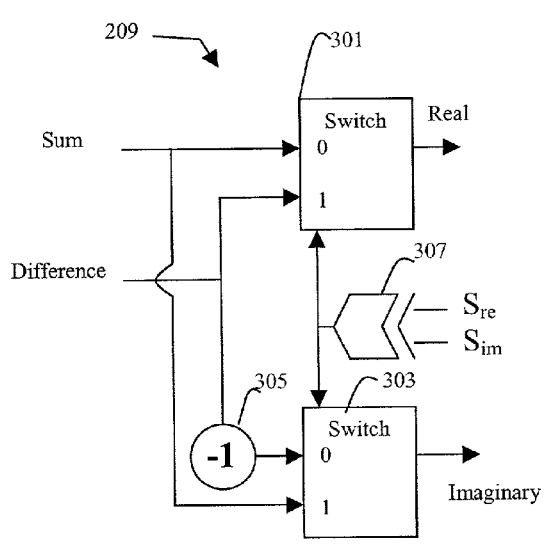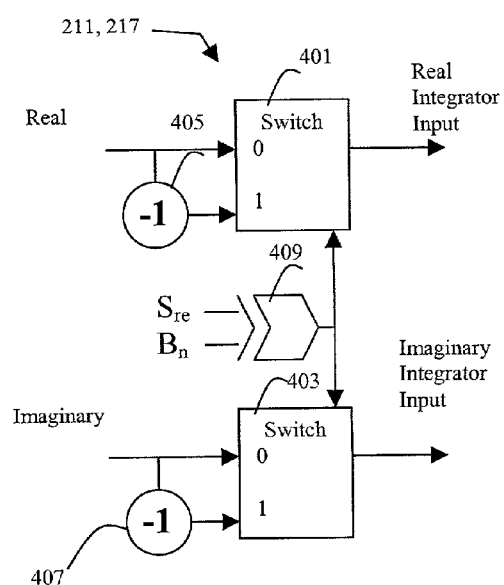
*Fig. 3* 300                *Fig. 4* 400

MULTICODE RECEIVER

TECHNICAL FIELD

The present invention is directed to communication systems and, more particularly, to the reception of multicode signals in a code-division multiple access (CDMA) system.

BACKGROUND ART

Digital communication systems typically include a mobile unit, which may be embodied in a digital cellular telephone or any other portable communication device, and infrastructure units, which may be embodied in a cellular base stations or any other suitable communication hardware. During operation, the mobile unit and an infrastructure unit exchange digital information using one of a number of communication protocols.

A number of different digital communication schemes are known. For example, second generation code-division multiple access (CDMA) systems are disclosed in the IS-95 communication standard, which is available from the Telecommunication Industry Association (TIA). Additionally, third generation (3G) standards and systems, which are typically referred to as WCDMA (Wideband CDMA) standards and systems, are emerging. One of the most prevalent WCDMA standards that is currently being developed is the IS-2000 standard, which is an evolution of the IS-95 standard. Additionally, the Universal Mobile Telecommunications System (UMTS) standard is an emerging WCDMA standard that is an evolution of the global system for mobile communications (GSM) standard.

In general, wireless communications applications are continually increasing the rate at which data is transferred. The International Telecommunications Union (ITU), via the IS-2000 standard, has required that standards bodies specify 3G systems enabling mobile wireless data communication at 384 kilobits per second (kbps) and fixed wireless data communication at 2 megabits per second (Mbps). To achieve these data rates, CDMA mobile units and CDMA infrastructure must exchange data using multiple channels in the same frequency band. In high data rate systems, a particular mobile unit may receive multiple channels of information in the same frequency band through the use of digital codes, such as Walsh codes, that are used to encode data transmitted by the infrastructure units. For example, WCDMA infrastructure encodes two portions of data for transmission to a particular mobile unit with the PN code for that mobile unit and encodes the first portion of data with a first Walsh code and encodes the second portion of data with a second Walsh code, thereby sending two channels of data to the mobile unit. Accordingly, the receiver of the mobile unit must recover these channels of data at a high rate and must process the data associated with all Walsh codes that the receiver is to process.

The volume of data that must be processed and the high rate of processing necessitate the use of hardware accelerators. However, as will be readily appreciated, powering multiple hardware accelerators to detect multiple channels carrying data for the mobile unit is costly both in terms of mobile unit battery life and processing demands.

SUMMARY OF THE INVENTION

According to one aspect, the present invention may be embodied in

These and other features of the present invention will be apparent to those of ordinary skill in the art in view of the description of the preferred embodiments, which is made with reference to the drawings, a brief description of which is provided below.

BRIEF DESCRIPTION OF THE DRAWINGS

FIG. 1 is an exemplary block diagram of a transmit lineup of a code-division multiple access (CDMA) communication system having multiple channel processing;

FIG. 2 is an exemplary block diagram of a receiver lineup having a multicode rake receiver having reduced complexity;

FIG. 3 is an exemplary block diagram of a selector for use with the multicode rake receiver of FIG. 2; and FIG. 4 is an exemplary block diagram of a selectable negation circuit for use with the multicode rake receiver of FIG. 2.

DESCRIPTION OF THE PREFERRED EMBODIMENTS

As described below in conjunction with the accompanying drawings, a mobile unit precomputes sums and differences of the in-phase and quadrature components of a received signal. Based on spreading and scrambling codes, which are tracked by the mobile unit, the precomuted sums and differences are combined to decode digital information that was sent to the mobile unit by an infrastructure unit. The ability to decode digital information based on precomputed sums and differences of received in-phase and quadrature information reduces the number of complex multiplication operations that must be carried out by the mobile unit to decode the digital information received from the infrastructure unit, thereby reducing the power consumption and freeing the computation resources of the mobile unit.

Turning now to FIG. 1, a transmit lineup 100, which may be embodied in cellular infrastructure, may include a first and second channel processors 101, 103, the output of each of which is coupled to a spreader 105. The spreader 105 is coupled to a scrambler 107, the output of which is coupled to an radio frequency (RF) transmitter 109 that includes an antenna 111. The transmit lineup 100, as shown in FIG. 1, may be used in a cellular base station of a CDMA system having multiple channel processing capabilities. In particular, the transmit lineup 100 may be used in connection with a 3G cellular system, the infrastructure of which may transmit information for a particular mobile unit on two or more channels.

In operation, the first and second channel processors 101, 103 generate a first and second bitstreams, which are referred to hereinafter as $D_1$ and $D_2$, respectively. The bitstreams may be representative of voice information or may be data information. The first and second channel processor 101, 103 may error process the first and second bitstreams to reduce the error rate of user equipment or a mobile unit when such equipment receives the bitstreams. Error processing may include, but is not limited to, cyclic redundancy check (CRC) generation, convolutional encoding, turbo encoding, interleaving, repeating and any other suitable and known error processing.

The first and second bitstream are coupled to the spreader 105, which spreads the first and second bitstreams by first and second binary spreading codes, referred to hereinafter as $B_1$ and $B_2$, respectively. The spreading codes $B_1$, $B_2$ may be embodied in, for example, Walsh codes. As will be appreciated by one having ordinary skill in the art, each of the spreading codes may be $2^N$ bits in length, wherein N is typically between 2 and 10. Further, each of the spreading codes is designed to be mutually orthogonal with other spreading codes. The mutually orthogonal nature of the spreading codes enables two or more CDMA transmitters and receivers to occupy the same geographical space and frequency bandwidth without significantly interfering with one another. For each bit of a bitstream, the spreader 105 generates $2^N$ bits corresponding to a particular spreading code that is exclusive-ORed (XORed) with the bit.

The output of the spreader 105 may be coupled to the scrambler 107, which scrambles the output of the spreader 105 by performing an exclusive-ORing (XORing) the output of the spreader 105 with a scrambling code, which is referred to hereinafter at $S_{re}+j\ S_{im}$. As will be appreciated by one having ordinary skill in the art, the scrambling code may be a complex signal having real and imaginary components that are each binary and that each have a periodicity much longer than the spreading factor. For example, a spreading code may be embodied in pseudorandom noise (PN) sequence.

According to conventionally known techniques, the RF transmitter 109 receives signals from the scrambler 107 and modulates a carrier signal based thereon. For example, the RF transmitter 109 may modulate an RF carrier using, quadrature phase shift keying (QPSK), differential quadrature phase shift keying (DQPSK), binary phase shift keying (BPSK), quadrature amplitude modulation (QAM), Gaussian minimum shift keying (GMSK) or any other suitable modulation technique. The RF transmitter 109 may also perform upconversion to mix the modulated carrier signal to an RF signal having a frequency and amplitude appropriate for transmission by the antenna 111. For example, the modulated carrier signal may be upconverted to a signal having a frequency in the range of, for example, 800, 900, 1800, 1900 megahertz (MHz) or any other suitable frequency range.

The technique of channel processing, spreading and scrambling, as described above in conjunction with components 101–107, may be described mathematically. As will be readily appreciated by those having ordinary skill in the art, the exclusive-OR (XOR) operation on binary symbols having values of 0 and 1 may be interchanged with multiplication on binary symbols having values of +1 and −1. Additionally, the operations of 0 XOR 0 and 1 XOR 1 are each equal to 0, and the operations of 0 XOR 1 and 1 XOR 0 are each equal to 1. Further, the operations of 1×1 and −1×−1 are each equal to 1, while the operations of 1×−1 and −1×1 are each equal to −1.

In a static channel, given first and second bitstreams ($D_1$, $D_2$), first and second binary spreading codes ($B_1$, $B_2$), and the complex scrambling code ($S_{re}+j\ S_{im}$), the complex received signal R having an in-phase component (I) and a quadrature component (Q) may be represented as shown in equation 1.

$$R=(I+j\ Q)=(D_1\ B_1+D_2\ B_2)(S_{re}+j\ S_{im}) \quad (1)$$

As shown in equation 1, the received signal (R) is the product of the sum of the products of the first and second bitstreams with the first and second spreading codes and the complex scrambling code. Accordingly, the real and imaginary components of the received signal are formed from the in-phase and quadrature components of the bitstreams, the spreading codes and the scrambling code.

FIG. 2 is an exemplary block diagram of a receiver lineup 200 including a multicode rake receiver 201 having reduced complexity. Such a receiver lineup could be implemented in a cellular mobile unit or the like. The receiver lineup 200 further includes an antenna 202 and an RF receiver 203. The output of the RF receiver 203 is coupled to the multicode rake receiver 201, which includes an adder 205, a subtractor 207, a selector 209, first and second selectable negation circuits 211, 213 and first and second integrators 215, 219.

In general, the structure shown in FIG. 2 accommodates two different spreading codes. The selector 209 processes signals for the two spreading codes. The selectable negation circuits 211, 217 each process signals for different ones of the spreading codes by routing signals from the adder 205 and the subtractor 207 to the selectable negation circuits 211, 213. Similarly, integrators 215, 219 each process signals for different ones of the spreading codes. Furthermore, although the structure shown and described in conjunction with FIG. 2 accommodates only two different spreading codes, those having ordinary skill in the art will readily appreciate that additional selectable negation circuits and integrators could be added to the structure of FIG. 2 to accommodate additional spreading codes.

During operation, the antenna 202 receives the signal transmitted by a transmit lineup (e.g., the transmit lineup 100 of FIG. 1) and the RF receiver 203 processes the received signal by downconverting the signal by the same frequency that was used for upconversion, which was previously described in connection with FIG. 1. The output of the RF receiver 203 is a complex baseband signal (R) including an in-phase component (I) and a quadrature component (Q).

As shown below, the bitstreams ($D_1$, D2) may be determined by making combinations of the in-phase (I) and quadrature (Q) components of the received signal (R). Further, while the determined bitstreams below are represented as real-valued, this is not necessarily always the case. For example, while the determined bitstreams may be real-valued when a real-valued bitstream is transmitted through a channel that is not a complex channel, if a real-valued bitstream is transmitted through a complex channel, the determined bitstream will be complex and will be multiplied by the complex conjugate of the channel estimate to determine the real-valued bitstream. Additionally, if a bitstream transmitted through any channel is a complex bitstream, the determined bitstreams will be complex in nature.

The following describes the mathematics underlying the ability to selectively combine and negate the received components, see equation 1, from the RF receiver 203. In particular, multiplying both sides of equation 1 by ($S_{re}-j\ S_{im}$) yields equation 2.

$$(S_{re}^2+S_{im}^2)(D_1\ B_1+D_2\ B_2)=(S_{re}-j\ S_{im})(I+j\ Q) \quad (2)$$

Because $S_{re}$ and $S_{im}$ are binary and have values of +1 or −1, equation 2 simplifies to equation 3.

$$2(D_1\ B_1+D_2\ B_2)=(S_{re}-j\ S_{im})(I+j\ Q) \quad (3)$$

The real and imaginary components of $2(D_1\ B_1+D_2\ B_2)$ may be expressed as functions of I and Q (the components of the received signal). In particular, the value of $D_1$ is determined by the values of $B_1$, $S_{re}$ and $S_{im}$, and the value of $D_2$ is determined by the values of $B_2$, $S_{re}$ and $S_{im}$. Accordingly, the value of $D_x$, which is the output of an integrator coupled to the selective negation circuit, is determined by the values of $B_x$, $S_{re}$ and $S_{im}$, as shown in Table 1.

Because the states of the spreading code (B) and the scrambling code ($S_{re}$ and $S_{im}$) are known, either of the first or second bit streams ($D_1$, $D_2$) may be determined. In particular, the first or second bits streams ($D_1$, $D_2$) are combinations of I and Q, which are the components of the received signal (R). The manner in which the components of the received signal are combined (e.g., added, subtracted, negated, etc.) is determined by the spreading code and the scrambling codes. Despite the fact that equation 3 includes two sets of bitstreams (i.e., $D_1$ and $D_2$), each of which corresponds to a different spreading code (i.e., $B_1$ and $B_2$), the orthogonal spreading codes and the integrators 215, 219 will subsequently eliminate the undesired bitstream and spreading code.

As shown in FIG. 2, a summer 205 produces the sum component I+Q and the subtractor 207 produces the difference component I−Q. The sum and difference components are inputs to the selector 209, which also receives the complex spreading code. In general, as shown in Table 1 and described in conjunction with FIG. 3, the in-phase and quadrature components of the complex spreading code determine how the sum and difference components determine what will be output by the selector 209.

The selector 209 is coupled to the first and second selectable negation circuits 211, 213, which selectively negate the sum and difference components provided by the selector 209 as real and imaginary components of $2D_x$. Further detail regarding the selectable negation circuits 211, 213 is provided hereinafter in conjunction with FIG. 4 and Table 1.

The first selectable negation circuit 211 sets a first integrator real input to the real signal and a first integrator imaginary input to the imaginary signal if $S_{re}$ XOR $B_1$=0. If $S_{re}$ XOR $B_1$=1, the selectable negation circuit 211 sets the first integrator real input to the negative of the real signal and the first integrator imaginary input to the negative of the imaginary signal. The first integrator 215 accumulates the first integrator real inputs and the first integrator imaginary inputs. The periodicity of the accumulation is the same as the periodicity of the first spreading code. The second selectable negation circuit 213 and the second integrator 219 function in the same manner on based on the second scrambling code.

As shown in FIG. 3, the selector 209 of FIG. 2 includes first and second switches 301, 303, an inverter 305 and a logical XOR gate 307. The real and imaginary components of the scrambling code are combined using the XOR gate 307 to produce a control signal. As shown in the selector output column of Table 1, if the control signal is a logical 0, the first switch 301 will output the sum component as the real component and the second switch 303 will, through the use of the inverter 305, output the negated difference signal as the imaginary component. Conversely, if the control signal is a logical 1, the first switch 301 will output the difference as the real component and the second switch 303 will output the sum component as the imaginary component.

As shown in FIG. 4, a selectable negation circuit, which may be the selectable negation circuit 211 of FIG. 2, includes first and second switches 401, 403, first and second inverters 405, 407 and a XOR gate 409. During operation of the selectable negation circuit 211 the real component of the scrambling code and the spreading code $B_x$ (where x=1 or 2) are combined by the XOR gate 409 to produce a control signal. The first and second switches 401, 403 receive the real and imaginary components from the switches 301, 303, respectively. Because FIG. 4 represents the selectable negation circuit 211 of FIG. 2, the outputs of the switches 401 and 403 are coupled to the first integrator 215 and $B_n$ is $B_1$.

During operation, as shown in Table 1, when $S_{re}$ XOR $B_x$ is zero, the real and imaginary components of the selector output are coupled directly to the output of the first and second switches 401, 403, respectively. Alternatively, when $S_{re}$ XOR $B_x$ is a logical one, the real and imaginary components of the selector output are negated before being coupled from the selectable negation circuit output.

It should be understood that the selectable negation circuit 217 may be identical to the selectable negation circuit 211, except that the output of 217 would be coupled to the integrator 219 of FIG. 2. Additionally, it will be appreciated that 217 would operate in a situation in which $B_n$ is $B_2$.

If the control signal is a logical 0, the switch 401 couples the real component from the selector 209 to a real input of the integrator 215 and couples the imaginary component from the selector 209 to an imaginary input of the integrator 215. Alternatively, if the control signal is a logical one, each of the real and imaginary components from the selector 209 is inverted before being coupled to the integrator 215.

The follow description pertinent to Table 1 uses the terms sum component and difference component to specifically mean I+Q and I−Q, respectively. Columns four and five of Table 1, illustrate the real and imaginary components that will be coupled to the integrator 215, presuming $B_n$ is $B_1$. Alternatively, if $B_n$ is $B_2$, Table 1 illustrates the real and imaginary components that will be coupled to the integrator 217.

Columns five and six represent the output of the selector 209, based on $S_{re}$ XOR $S_{im}$, which is shown in column four. In particular, if $S_{re}$ XOR $S_{im}$=1, the sum component (I+Q) is the imaginary component and the difference component (I−Q) is the real signal. Alternatively, if $S_{re}$ XOR $S_{im}$=0, the sum (I+Q) component is the real component and the negated difference component (−I+Q) is the imaginary component.

The contents of columns five and six, which represent the real and imaginary outputs, respectively, of the selector 209, are operated on by the selectable negation circuit, as previously described in connection with FIG. 4, to produce the results shown in columns eight and nine of Table 1. The operation performed by the selectable negation circuit 211 is controlled by the XOR of $S_{re}$ and $B_n$, which is shown in column seven of Table 1. In particular, if $S_{re}$ XOR $B_n$=1, both the real and imaginary components from the selector 209 are negated and taken as outputs of the selectable negation circuit 211. Alternatively, if $S_{re}$ and $B_n$=0, the real and imaginary components are not negated and are merely passed through the selectable negation circuit 211.

TABLE 1

| | | | | Selector Output | | | Selectable Negation Circuit Output | |
|---|---|---|---|---|---|---|---|---|
| $B_x$ | $S_{re}$ | $S_{im}$ | $S_{re}$ XOR $S_{im}$ | Real | Imag. | $S_{re}$ XOR $B_x$ | Real | Imag. |
| 0 | 0 | 0 | 0 | I + Q | −I + Q | 0 | I + Q | −I + Q |
| 0 | 0 | 1 | 1 | I − Q | I + Q | 0 | I − Q | I + Q |
| 0 | 1 | 0 | 1 | I − Q | I + Q | 1 | −I + Q | −I − Q |
| 0 | 1 | 1 | 0 | I + Q | −I + Q | 1 | −I − Q | I − Q |

TABLE 1-continued

| | | | | Selector Output | | | Selectable Negation Circuit Output | |
|---|---|---|---|---|---|---|---|---|
| $B_x$ | $S_{re}$ | $S_{im}$ | $S_{re}$ XOR $S_{im}$ | Real | Imag. | $S_{re}$ XOR $B_x$ | Real | Imag. |
| 1 | 0 | 0 | 0 | I + Q | −I + Q | 1 | −I − Q | I − Q |
| 1 | 0 | 1 | 1 | I − Q | I + Q | 1 | −I + Q | −I − Q |
| 1 | 1 | 0 | 1 | I − Q | I + Q | 0 | I − Q | I + Q |
| 1 | 1 | 1 | 0 | I + Q | −I + Q | 0 | I + Q | −I + Q |

Numerous modifications and alternative embodiments of the invention will be apparent to those skilled in the art in view of the foregoing description. Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

What is claimed is:

1. A code-divisional access (CDMA) receiver for de-scrambling and de-spreading a received signal that was scrambled by a complex scrambling code into a first integrator input and a second integrator input, the received signal having in-phase and quadrature components, wherein the first integrator input and the second integrator input estimate a first and second communication signals that were scrambled by first and second scrambling codes, respectively, the CDMA receiver comprising:
    a summer for producing a sum signal by adding the in-phase and quadrature components of the received signal;
    a substractor for producing a difference signal by computing the difference between the in-phase component and the quadrature components of the received signal;
    a selector for selecting one of the sum and difference signals to be an imaginary component based on the complex scrambling code and for selecting the other one of the sum and difference signals to be a real component;
    a first selectable negation circuit for producing the first integrator input by selectively negating the real and imaginary components based on the complex scrambling code and the first scrambling code; and
    a second selectable negation circuit for producing the second integrator input by selectively negating the real and imaginary components based on the complex scrambling code and the second scrambling code.

2. The CDMA receiver of claim 1, wherein the difference signal is equal to the in-phase component minus the quadrature component.

3. The CDMA receiver of claim 2, wherein the complex scrambling code has a scrambling real component and a scrambling imaginary component, and wherein the sum signal is selected as the imaginary component if a bit of the scrambling real component and a corresponding bit of the scrambling imaginary component of the complex scrambling code are of a different value, and the difference signal is selected as the imaginary component if a bit of the scrambling real component and a corresponding bit of the scrambling imaginary component of the complex scrambling code are of the same value.

4. The CDMA receiver of claim 3, wherein if the difference signal is selected as the imaginary component, the imaginary component is negated.

5. The CDMA receiver of claim 1, wherein the difference signal is equal to the quadrature component minus the in-phase component.

6. The CDMA receiver of claim 5, wherein the complex scrambling code has a scrambling real component and a scrambling imaginary component, and wherein the sum signal is selected as the imaginary component if a bit of the scrambling real component and a corresponding bit of the scrambling imaginary component of the complex scrambling code are of a different value, and the difference signal is selected as the imaginary component if a bit of the scrambling real component and a corresponding bit of the scrambling imaginary component of the complex scrambling code are of the same value.

7. The CDMA receiver of claim 6, wherein if the sum signal is selected as the imaginary component, the imaginary component is negated.

8. The CDMA receiver of claim 1, wherein the complex scrambling code has a scrambling real component and a scrambling imaginary component and wherein the real and imaginary components are negated to produce the first integrator input if a bit of the scrambling real component of the complex scrambling code and a corresponding bit of the first scrambling code are of a different value.

9. The CDMA receiver of claim 1, wherein the complex scrambling code has a scrambling real component and a scrambling imaginary component, and wherein the real and imaginary components are negated to produce the second integrator input if a bit of the scrambling real component of the complex scrambling code and a corresponding bit of the second scrambling code are of a different value.

10. A method of de-spreading a received signal that was scrambled by a complex scrambling code into de-scrambled first and second communication signals, the received signal having in-phase and quadrature components, wherein the de-scrambled first and second communication signals were spread by first and second scrambling codes, respectively, the method comprising:
    producing a sum signal by adding the in-phase and quadrature components of the received signal;
    producing a difference signal by computing the difference between the in-phase component and the quadrature component of the received signal;
    selecting one of the sum and difference signals to be an imaginary component based on the complex scrambling code;
    selecting the other one of the sum and difference signals to be a real component;
    producing a first integrator input by selectively negating the real and imaginary components based on the complex scrambling code and the first scrambling code; and
    producing a second integrator input by selectively negating the real and imaginary components based on the complex scrambling code and the second scrambling code.

11. The method of claim 10, wherein the difference signal is equal to the in-phase component minus the quadrature component.

12. The method of claim 11, wherein the complex scrambling code has a scrambling real component and a scrambling imaginary component, and wherein the sum signal is selected as the imaginary component if a bit of the scrambling real component and a corresponding bit of the scrambling imaginary component of the complex scrambling code are of a different value, and the difference signal is selected as the imaginary component if a bit of the scrambling real component and a corresponding bit of the scrambling imaginary component of the complex scrambling code are of the same value.

13. The method of claim 12, wherein if the difference signal is selected as the imaginary component, the imaginary component is negated.

14. The method of claim 10, wherein the difference signal is equal to the quadrature component minus the in-phase component.

15. The method of claim 14, wherein the complex scrambling code has a scrambling real component and a scrambling imaginary component, and wherein the sum signal is selected as the imaginary component if a bit of the scrambling real component and a corresponding bit of the scrambling imaginary component of the complex scrambling code are of a different value, and the difference signal is selected as the imaginary component if a bit of the scrambling real component and a corresponding bit of the scrambling imaginary component of the complex scrambling code are of the same value.

16. The method of claim 15, wherein if the sum signal is selected as the imaginary component, the imaginary component is negated.

17. The method of claim 10, wherein the complex scrambling code has a scrambling real component and a scrambling imaginary component, and wherein the real and imaginary components are negated to produce the first integrator input if a bit of the scrambling real component of the complex scrambling code and a corresponding bit of the first scrambling code are of a different value.

18. The method of claim 10, wherein the complex scrambling code has a scrambling real component and a scrambling imaginary component, and wherein the real and imaginary components are negated to produce the second integrator input if a bit of the scrambling real component of the complex scrambling code and a corresponding bit of the second scrambling code are a different value.

* * * * *